US012680878B2

(12) United States Patent
Micque et al.

(10) Patent No.: US 12,680,878 B2
(45) Date of Patent: Jul. 14, 2026

(54) ESTIMATION OF THE TEMPERATURE OF A STEEL PRODUCT

(71) Applicant: ArcelorMittal, Luxembourg (LU)

(72) Inventors: Noëlle Micque, Semecourt (FR); Gwenaël Le Noc, Ars-sur-Moselle (FR); Morgan Ferte, Jury (FR)

(73) Assignee: ArcelorMittal, Luxembourg (LU)

( * ) Notice: Subject to any disclaimer, the term of this patent is extended or adjusted under 35 U.S.C. 154(b) by 364 days.

(21) Appl. No.: 18/265,806

(22) PCT Filed: Dec. 8, 2021

(86) PCT No.: PCT/IB2021/061437
§ 371 (c)(1),
(2) Date: Jun. 7, 2023

(87) PCT Pub. No.: WO2022/130125
PCT Pub. Date: Jun. 23, 2022

(65) Prior Publication Data
US 2024/0118139 A1 Apr. 11, 2024

(30) Foreign Application Priority Data

Dec. 15, 2020 (WO) .................. PCT/IB2020/061937

(51) Int. Cl.
*G01J 5/00* (2022.01)
*G01J 5/10* (2006.01)
(Continued)

(52) U.S. Cl.
CPC ........... *G01J 5/0003* (2013.01); *G01J 5/0022* (2013.01); *G01J 5/10* (2013.01); *G01J 5/52* (2013.01);
(Continued)

(58) Field of Classification Search
CPC .......... G01J 5/0003; G01J 5/0022; G01J 5/10; G01J 5/52; G01J 5/802; G01J 2005/0029;
(Continued)

(56) References Cited

U.S. PATENT DOCUMENTS

| | | | |
|---|---|---|---|
| 6,016,190 A | 1/2000 | Glazman et al. | |
| 2009/0210191 A1 | 8/2009 | Rogers et al. | |
| 2015/0226610 A1 | 8/2015 | Uematsu et al. | |

FOREIGN PATENT DOCUMENTS

| | | | | | |
|---|---|---|---|---|---|
| CN | 1663039 A | * | 8/2005 | ............ | G01J 5/0801 |
| CN | 101162171 A | | 4/2008 | | |

(Continued)

OTHER PUBLICATIONS

Search Report of PCT/IB2021/061437 of Jan. 24, 2022 and International Report on Patentability.

*Primary Examiner* — Nathaniel T Woodward
*Assistant Examiner* — Julia Fitzpatrick
(74) *Attorney, Agent, or Firm* — Davidson Kappel LLC

(57) ABSTRACT

A method for estimating the temperature of a steel product including a calibration step wherein the intensities at 5 wavelengths ranging from 0.9 to 2.1 μm are recorded for several measurement condition and spectral attenuation coefficients are computed, a measurement step wherein the intensities at said 5 wavelengths are recorded and spectral attenuation coefficients are computed for several temperatures and a comparison step wherein a probability test is performed to estimate the steel product temperature.

13 Claims, 4 Drawing Sheets

(51) Int. Cl.
    G01J 5/52       (2022.01)
    G01J 5/80       (2022.01)

(52) U.S. Cl.
    CPC ....... G01J 5/802 (2022.01); *G01J 2005/0029*
               (2013.01); *G01J 2005/0074* (2013.01)

(58) Field of Classification Search
    CPC ........ G01J 2005/0074; G01J 5/80; G01J 5/00;
                              G01J 2005/00
    See application file for complete search history.

(56)                References Cited

FOREIGN PATENT DOCUMENTS

| | | | | | |
|---|---|---|---|---|---|
| CN | 101706346 | A | | 5/2010 | |
| CN | 104864977 | A | | 8/2015 | |
| CN | 110312927 | A | * | 10/2019 | ......... G01N 33/2028 |
| EP | 0143282 | A2 | * | 6/1985 | ............. G01J 5/601 |
| EP | 2889594 | A1 | | 7/2015 | |
| GB | 2453966 | A | * | 4/2009 | ............... G01J 5/60 |
| JP | H03200027 | A | | 9/1991 | |
| JP | H11325839 | A | | 11/1999 | |
| JP | 2013127378 | A | * | 6/2013 | |
| JP | 2013234984 | A | * | 11/2013 | |
| JP | 5708891 | B2 | | 4/2015 | |
| JP | 2019020370 | A | | 2/2019 | |
| KR | 19990044469 | A | | 6/1999 | |
| RU | 2151382 | C1 | * | 6/2000 | |
| RU | 2014143378 | A | * | 5/2016 | |
| WO | WO-0054017 | A1 | * | 9/2000 | ............ G01K 11/00 |
| WO | WO-2008044263 | A1 | * | 4/2008 | ............... G01J 5/08 |
| WO | WO-2014067549 | A1 | * | 5/2014 | ............ G01J 5/004 |

* cited by examiner

ESTIMATION OF THE TEMPERATURE OF A STEEL PRODUCT

This invention relates to a method for estimating the temperature of a steel product undergoing a cooling treatment. The present method is particularly advantageous when water is present on said steel product. For example, in steelmaking, the claimed method can be applied during the secondary cooling during of a continuous casting or in the run-out table of a hot rolling mill.

BACKGROUND

During the manufacturing of a steel strip, from its casting to its coiling, the steel undergoes several cooling operations. Those operations usually involve spraying water onto the steel. It can lead to the formation of a water film on the strip surface.

The cooling operations usually involves models to regulate the cooling power. Those models have as input data the strip temperature. So, in order to reliably master the cooling, knowing precisely the temperature during the cooling operations is key.

SUMMARY OF THE INVENTION

Pyrometers, measuring the radiation intensities, are usually used to measure the steel product temperature. However, the intensity of the measured radiation is impacted by the presence of a medium between the product and the pyrometer, such as a water layer on the product. For example, when the steel surface and environment is free from any disturbance, their precision is around $\pm 10°$ C. When water is present on the steel surface or when a fog is between the steel and the pyrometer, the measurement error can go up to $100°$ C. When water is present on the steel and a fog is between the steel and the pyrometer, the measurement error can go up to $200°$ C.

Consequently, there is a need to improve the accuracy of the measure of the steel temperature when water is on the steel and/or a fog is between the strip and the measurement device.

EP 2 889 594 discloses a method to accurately measure the surface temperature of a steel material in a cooling process with water. The radiation in the wavelength bands of 0.7 to 0.9 μm, 1.0 to 1.2 μm, and 1.6 to 1.8 μm are recorded. To measure the steel temperature, a pyrometer is used. Moreover, an optical glass is placed between the pyrometer and the steel and is placed at a determined space from the steel. The optical glass is also positioned such that during the cooling process, cooling water enters the space between the steel material and the optical glass in order to have a steady surface tension. Consequently, the medium between the optical glass and the steel is known. The measured radiations intensity are then corrected using a coefficient linked to the gap between the steel material and the optical glass. It permits to reduce the temperature measurement error caused by absorption or scattering of the radian energy by water.

One purpose of the present invention is to provide a method improving the accuracy of the temperature measurement of a steel strip during a cooling operation.

The present invention provides a method for estimating the temperature $T_{REAL}$ of a steel product, having a temperature from $300°$ C. to $1600°$ C. comprising:

A. A calibration step comprising the steps of
   i. Measuring intensities (I),
      at 5 wavelengths (λ) ranging from 0.9 to 2.1 μm, wherein one is from 0.9 μm to 1.35 μm, one is from 1.35 μm to 1.55 μm, one is from 1.55 μm to 1.85 μm, one is from 1.85 μm to 2.05 μm and one is from 2.05 μm to 2.1 μm, by means of a sensor, of the radiation emitted by a reference having a known temperature ($T_{REF}$) in measurement conditions characterised by an emissivity of said reference ($\varepsilon_{REF}$) and a transmittance of a medium between said reference and said sensor ($\alpha_{REF}$), wherein said reference is a steel product,
   ii. Computing a spectral attenuation coefficient $C_{CALIB}$ using said measured intensities (I) at said 5 wavelengths, $$C_{CALIB} = \frac{I}{P(\lambda, T_{REF})} = \varepsilon_{REF} \cdot \alpha_{REF}$$

where $P(k, T_{REF})$ is the spectral density of electromagnetic radiation emitted by a black body in thermal equilibrium, based on the Planck Law, at a wavelength (λ) and at a temperature ($T_{REF}$),
   iii. Repeating the steps i. and ii. for $N_{CALIB}$ different combination of reference emissivity ($\varepsilon_{REF}$) and transmittance of a medium between said reference and said sensor ($\alpha_{REF}$) to get $N_{CALIB}$ spectral attenuation coefficients, $N_{CALIB}$ being an integer greater than 2,
B. A measurement step comprising the steps of
   i. Measuring intensities of the radiation emitted by said steel product, I, at said 5 wavelengths (λ) ranging from 0.9 to 2.1 μm,
   ii. Computing $N_T$ spectral attenuation coefficients $C_{COMPUTE}Tj$, for $N_T$ temperatures (Tj) ranging from 300 to $1600°$ C. and for said 5 wavelengths, $N_T$ being an integer from 2 to 1300, $$C_{COMPUTE}Tj = \frac{1}{P(\lambda, Tj)} = \varepsilon_{COMPUTE} \times \alpha_{COMPUTE}$$

where
      $P(\lambda, T_J)$ is the spectral density of electromagnetic radiation emitted by a black body in thermal equilibrium, based on the Planck Law, at a wavelength of) and at a temperature $T_J$,
C. A comparison step comprising the steps of
   i. Performing a probability test for finding the most likely $C_{COMPUTE}Tj$ among the $C_{CALIB}$
   ii. Estimating the temperature of said steel product, $T_{REAL}$ as being equal to the temperature $T_J$ of said most likely $C_{COMPUTE}T_J$.

BRIEF DESCRIPTION OF THE DRAWINGS

Other characteristics and advantages will become apparent from the following detailed description of the invention.

DETAILED DESCRIPTION

The invention relates to a method for estimating the temperature $T_{REAL}$ of a steel product, having a temperature from 300° C. to 1600° C. comprising:

A. A calibration step comprising the steps of i. Measuring intensities (I), at 5 wavelengths ($\lambda$) ranging from 0.9 to 2.1 µm, wherein one is from 0.9 µm to 1.35 µm, one is from 1.35 µm to 1.55 µm, one is from 1.55 µm to 1.85 µm, one is from 1.85 µm to 2.05 µm and one is from 2.05 µm to 2.1 µm, by means of a sensor, of the radiation emitted by a reference having a known temperature ($T_{REF}$) in measurement conditions characterised by an emissivity of said reference ($\varepsilon_{REF}$) and a transmittance of a medium between said reference and said sensor ($\alpha_{REF}$), wherein said reference is a steel product, ii. Computing a spectral attenuation coefficient $C_{CALIB}$ using said measured intensities (I) at said 5 wavelengths, $$C_{CALIB} = \frac{I}{P(\lambda, T_{REF})} = \varepsilon_{REF} \cdot \alpha_{REF}$$

where $P(\lambda, T_{REF})$ is the spectral density of electromagnetic radiation emitted by a black body in thermal equilibrium, based on the Planck Law, at a wavelength ($\lambda$) and at a temperature ($T_{REF}$), iii. Repeating the steps i. and ii. for $N_{CALIB}$ different combination of reference emissivity ($\varepsilon_{REF}$) and transmittance of a medium between said reference and said sensor ($\alpha_{REF}$) to get $N_{CALIB}$ spectral attenuation coefficients, $N_{CALIB}$ being an integer greater than 2, B. A measurement step comprising the steps of i. Measuring intensities of the radiation emitted by said steel product, I, at said 5 wavelengths ($\lambda$) ranging from 0.9 to 2.1 µm, ii. Computing $N_T$ spectral attenuation coefficients $C_{COMPUTE}Tj$, for $N_T$ temperatures (Tj) ranging from 300 to 1600° C. and for said 5 wavelengths, $N_T$ being an integer from 2 to 1300, $$C_{COMPUTE}Tj = \frac{1}{P(\lambda, Tj)} = \varepsilon_{COMPUTE} \times \alpha_{COMPUTE}$$

where $P(\lambda, T_j)$ is the spectral density of electromagnetic radiation emitted by a black body in thermal equilibrium, based on the Planck Law, at a wavelength of $\lambda$ and at a temperature $T_j$, C. A comparison step comprising the steps of i. Performing a probability test for finding the most likely $C_{COMPUTE}Tj$ among the $C_{CALIB}$ ii. Estimating the temperature of said steel product, $T_{REAL}$ as being equal to the temperature $T_j$ of said most likely $C_{COMPUTE}Tj$.

Figure 1:
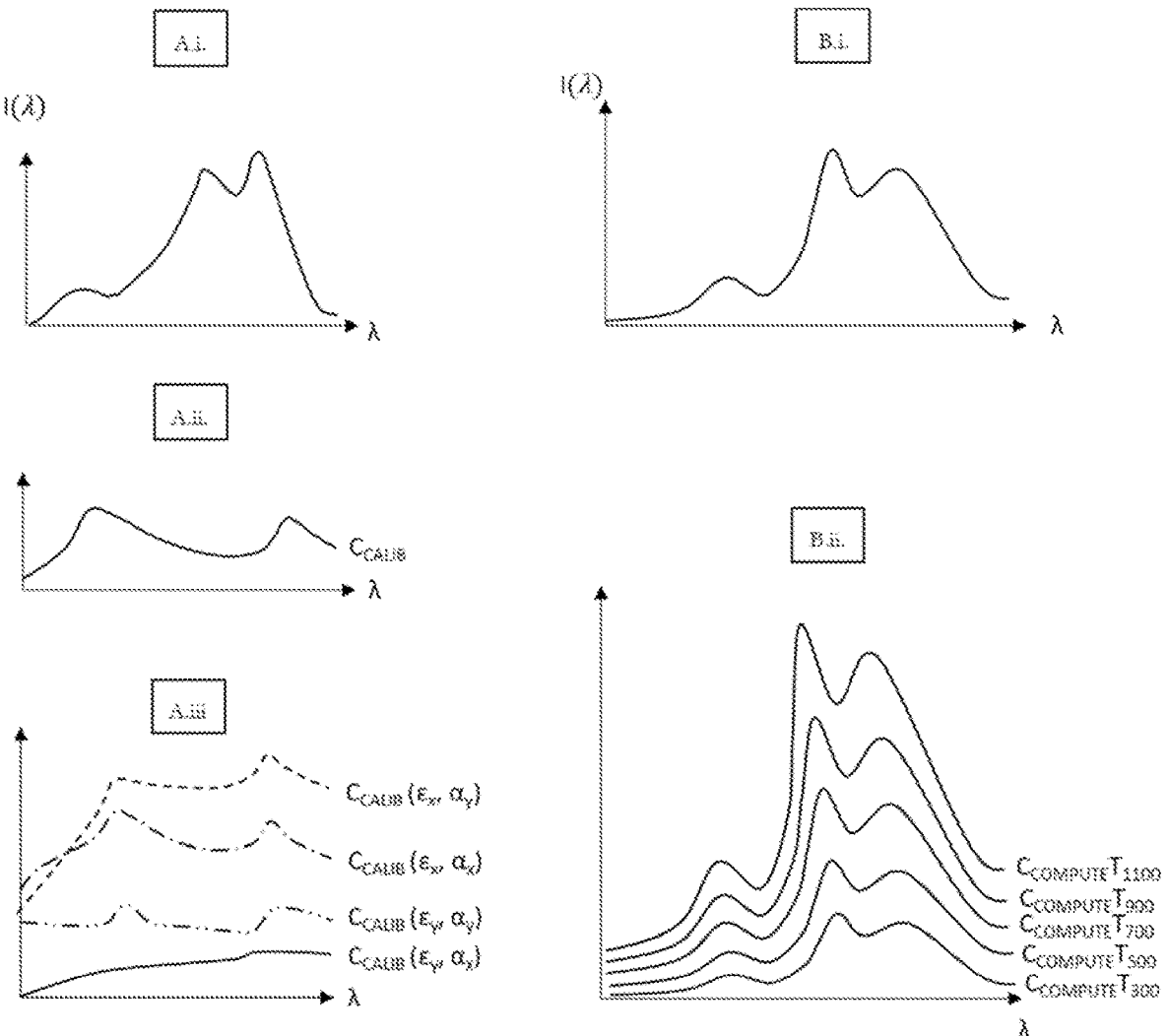
FIG. 1 illustrates an embodiment of the steps A.i. to B.ii. of the claimed process.

The steps of the process are illustrated in FIG. 1.

The steel product can be any type of product such as a strip, a band or a slab. The temperature of the steel product is not known however, depending on the process steps wherein the measurement is performed, the skilled in the art knows the range in which the temperature should be. For example, in a cooling treatment of a steel strip following a hot rolling, the temperature of the steel strip is generally comprised between 300° C. and 1100° C.

In the calibration step A.i., the intensities of the radiation emitted by the reference steel product can be measured by any suitable means. They are preferably measured by a hyperspectral camera.

In the calibration step A.i., the reference steel product has preferably a composition similar to the steel product having its temperature estimated. Even more preferably, the reference steel product has the same grade as the steel product being analysed.

In the calibration step A.i., the temperature of the reference steel product can be measured by any means. Preferably, this temperature is measured using thermocouples.

In the calibration step A.ii., a spectral attenuation coefficient $C_{CALIB}$ can be computed by dividing each of the recorded intensities I by $P(\lambda, Tj)$ at the measured temperature.

The step A.i. and A.ii. are repeated for $N_{CALIB}$ times, each time corresponding to new measurement conditions. Measurement conditions are defined by a combination of the reference emissivity ($\varepsilon_{REF}$) and the transmittance of the media between the reference and the sensor ($\alpha_{REF}$) It permits to get various $C_{CALIB}$ for different measurement conditions. The greater $N_{CALIB}$, greater is the accuracy of the estimation.

In other words, the steps i. and ii. of the calibration step A. are repeated for various combinations of steel product emissivity ($\varepsilon_{REF}$) and measurement condition transmittance ($\alpha_{REF}$). $\varepsilon_{REF}$ varies as a function of several factors such as the temperature of the reference steel product, the surface properties (such as presence of oil). $\alpha_{REF}$ depends on the medium between the sensor and the reference steel product such as the thickness of a water layer on the reference steel product.

However, the value of $\varepsilon_{REF}$ and $\alpha_{REF}$ do not need to be known to compute the $C_{CALIB}$.

In the measurement step B.i., the intensities emitted by said steel product are preferably measured using a hyperspectral camera. The wavelength at which the intensities are measured in step B.i. are the same as the one in step A.i.

In the measurement step B.ii., greater is the number of temperature ($N_T$) for which a spectral attenuation coefficient is computed, greater is the accuracy of the estimation.

Moreover, in both the calibration and the measurement steps, the measured intensities can be adjusted using a transfer function.

Measuring the radiation intensities at said 5 wavelengths, one from 0.9 µm to 1.35 µm, one from 1.35 µm to 1.55 µm, one from 1.55 µm to 1.85 µm, one from 1.85 µm to 2.05 µm and one from 2.05 µm to 2.1 µm permits to describe the spectrum shape of a combination of the product emissivity and of the medium transmittance using a reduced number of intensities. Indeed, in a range from 0.9 to 2.1, the absorption spectrum of water, as represented in FIG. 1, exhibits two peaks, one from 1.35 μm to 1.55 μm and one from 1.85 μm to 2.05 μm.

In the comparison step C., a probability test is performed to find the most likely $C_{COMPUTED}T_J$ among the $C_{CALIB}$. Any method permitting to find the most likely $C_{COMPUTED}T_J$ among the $C_{CALIB}$ can be performed.

This method permits to improve the accuracy of the temperature estimation of a steel product because the estimation considers the influence of the measurement condition, such as the presence of water on the steel product.

Preferably, said cooling treatment is done during or following a hot rolling and said steel product has a temperature from 300° C. to 1100° C. and wherein in step B, $T_J$ ranges from 300° C. to 1100° C. This cooling is usually performed in a run-out-table.

Preferably, said cooling treatment is done during or continuous casting and said steel product has a temperature from 800° C. to 1600° C. and wherein in step B, $T_J$ ranges from 800° C. to 1600° C.

Figure 2:
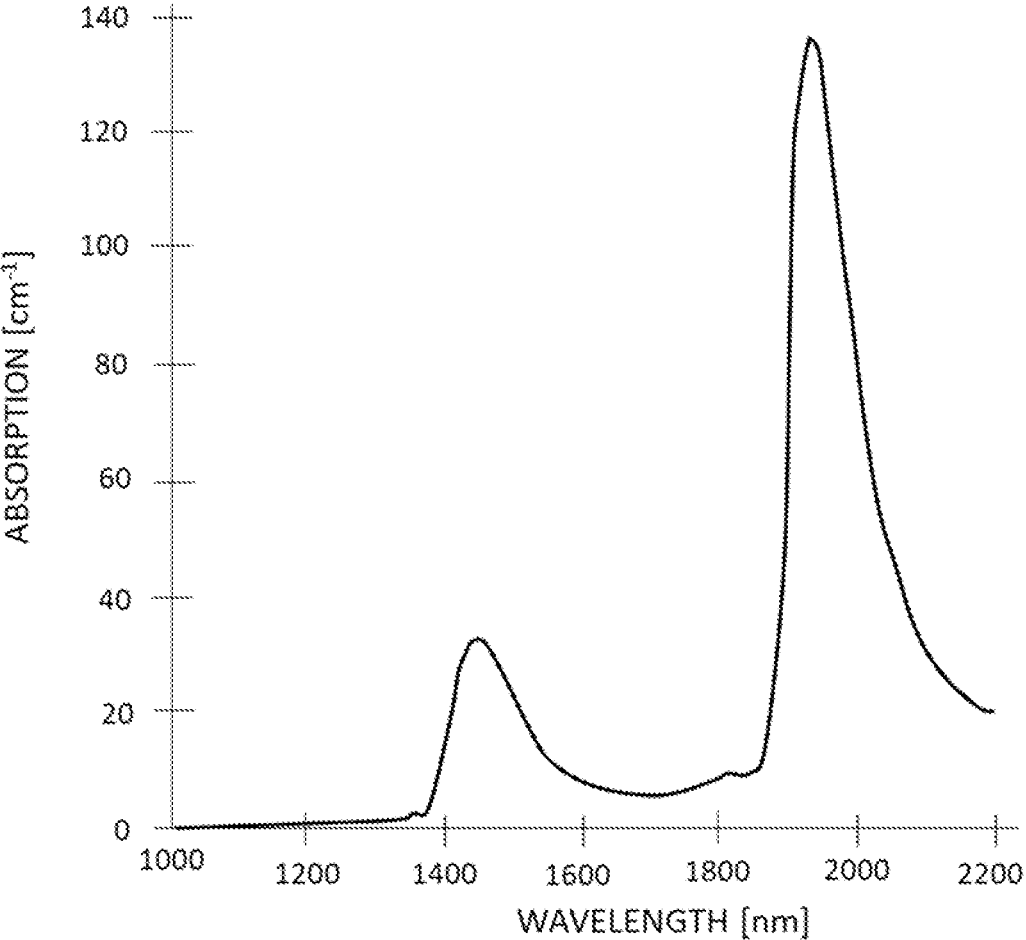
FIG. 2 illustrates an embodiment of an absorption spectrum of water in function of the wavelength.
Figure 3:
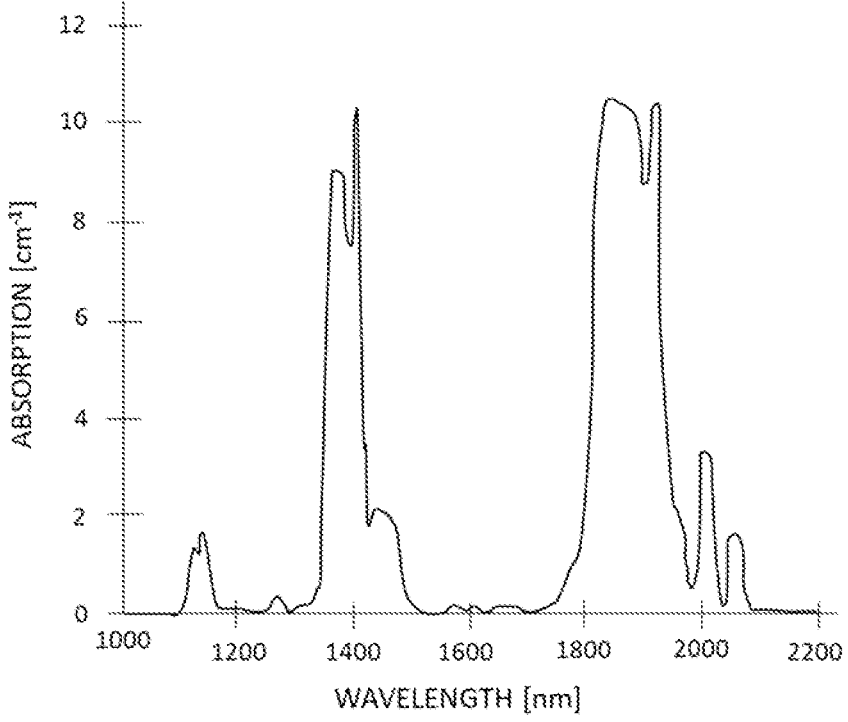
FIG. 3 illustrates an embodiment of an absorption spectrum of water vapor in function of the wavelength.

Preferably, in steps A)i. and B)i., the radiation intensities of 8 wavelengths (λ) ranging from 0.9 to 2.1 μm, wherein one is from 0.9 μm to 1.11 μm, one is from 1.11 μm to 1.15 μm, one is from 1.15 μm to 1.35 μm, one is from 1.35 μm to 1.55 μm, one is from 1.55 μm to 1.85 μm, one is from 1.85 μm to 2.05 μm, one is from 2.05 μm to 2.07 μm and one is from 2.07 μm to 2.1 μm are measured and in steps A)ii. and B)ii., spectral attenuation coefficients for said 8 wavelengths are computed. Measuring the radiation intensities of those said 8 wavelengths improves the accuracy of the measurement when a medium, such as a vapor, is present between the steel product and the sensor. The ranges, from 1.11 μm to 1.15 μm and from 2.05 to 2.07 μm corresponds to peaks of the absorption spectrum of vapor, as illustrated in FIG. 2. Moreover, those two peaks do not match peaks of the absorption spectrum of water.

Preferably, in steps A)i. and B)i., the radiation intensities at 5 additional wavelengths ranging from 0.9 to 2.1 μm are measured and in step steps A)ii. and B)ii., spectral attenuation coefficients for said 8 wavelengths and said 5 additional wavelengths are computed. The 13 wavelengths are preferably evenly distributed in said ranges which means that the 13 wavelengths are spaced by an interval of 0.1 μm (0.9, 1.0, . . . , 2.0, 2.1).

Preferably, in steps A)i. and B)i., the radiation intensities at 42 additional wavelengths ranging from 0.9 to 2.1 μm are measured and in step steps A)ii. and B)ii., spectral attenuation coefficients for said 8 wavelengths and said 42 additional wavelengths are computed.

Preferably, in steps A)i. and B)i., the radiation intensities at 92 additional wavelengths ranging from 0.9 to 2.1 μm are measured and in step steps A)ii. and B)ii., spectral attenuation coefficients for said 8 wavelengths and 92 additional wavelengths are computed.

Preferably, $N_{CALIB}$ is an integer from 2 to 1000 and preferably from 20 to 1000.

Preferably, in step C)i., the probability test comprises a dimensionality reduction on said $C_{CALIB}$ defining main components. Even more preferably, in step C)i., the dimensionality reduction is performed with a principal component analysis.

Preferably, in step C)i., the probability test comprises the projection of said $C_{CALIB}$ in a probabilistic model. Even more preferably, in step C)i., said probabilistic model is a Gaussian mixture model.

Embodiment of the Invention

In order to assess the accuracy of the claimed method, the temperature of a steel strip being cooled in a run-out table has been measured by a thermocouple and estimated by the present method.

A. Calibration Step

During the calibration step, the radiation intensity emitted by a steel strip, being cooled in a run-out table, has been recorded by a hyperspectral camera. More precisely, the intensities at 256 wavelengths ranging from 1.1 to 2.1 μm have been recorded. The 256 wavelengths were evenly distributed in said range. The temperature of the steel strip has been measured by thermocouples.

The calibration steps comprised 6 trials lasting between 5 and 15 minutes wherein the radiation intensities were measured between 10 and 100 times per second. So, few thousands measurement conditions were recorded. They took place during the cooling (presence of droplet, fog and water) and after/prior the cooling (no presence of water/fog) and for steel strip having various oxidation level.

Figure 4:
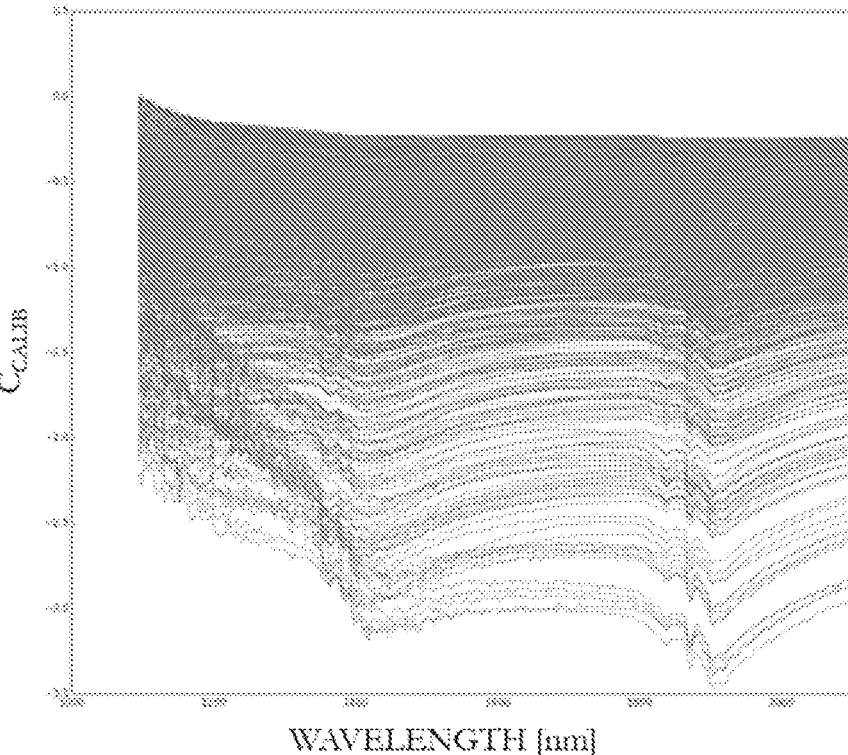
FIG. 4 illustrates an embodiment of several spectral attenuation coefficients $C_{CALIB}$ computed in a calibration step.

Then, several spectral attenuation coefficient $C_{CALIB}$ have been computed using the spectral density of electromagnetic radiation emitted by a black body in thermal equilibrium, the measured temperature by the thermocouples and the transfer function of the hyperspectral camera. Each of the $C_{CALIB}$ had 256 values, one for each of said 256 wavelengths. The $C_{CALIB}$ are plotted in FIG. 4.

B. Measurement

During the measurement step, the radiation intensity emitted by a steel strip, being cooled in a run-out table, has been recorded by a hyperspectral camera. More precisely, the intensities, at the same 256 wavelengths as in the calibration step, have been recorded.

Moreover, 261 temperatures ranging from 300 to 1600° C. have been defined as possible temperatures for the measured steel strip, so $N_T$=261. Those temperatures were spaced by an interval of 5° C.: (300, 305, 310 . . . 1595, 1600° C.).

Then, the measured radiation intensities at said 256 wavelengths have been divided by the value of the Planck's law and multiplied by the transfer function for each of the 261 temperatures defined previously. So, 261 spectral attenuation coefficients $C_{COMPUTE}T_J$ were computed. Each of said 261 spectral attenuation coefficients had 256 values, one for each measured wavelength, and a temperature associated.

C. Comparison

The probability test of this embodiment comprises the following steps

1) A principal component analysis (PCA) is performed on all the spectral attenuation coefficients $C_{CALIB}$, obtained during the calibration step, to get 3 main PCA components ($PC_1$, $PC_2$, $PC_3$). Then, each $C_{CALIB}$ of the database is approximated using said three main components.

2) The spectral attenuation coefficients are projected into a PCA space defined by the 3 main components previously defined.

3) The density of points in the PCA space of step 2) is projected in a Gaussian mixture model.

4) Each of said 261 $C_{COMPUTE}T_J$ is projected into the PCA space defined by the 3 main components previously defined.

5) For each of the 261 $C_{COMPUTE}T_J$, an approximated spectral attenuation coefficient is reconstructed from its coordinates in the PCA space defined in 4) and a first likelihood factor (Like1) is defined by comparing the original spectral attenuation and its reconstruction from the PCA coefficients.

6) Each of said 261 $C_{COMPUTE}T_J$ is projected in the Gaussian mixture model defined in 3) and a second likelihood factor (Like2) is determined. Like2 represents the local density of the learning data projected in the PCA space.

So, two likelihoods (Like1 and Like2) are associated to each of said 261 $C_{COMPUTE}T_J$.

7) Then, the product of Like1 and Like2 is calculated for each of said 261 $C_{COMPUTE}T_J$.

Finally, the temperature associated to the $C_{COMPUTE}T_J$ maximizing the product of 7) is defined as being the temperature of the steel strip.

Figure 5:
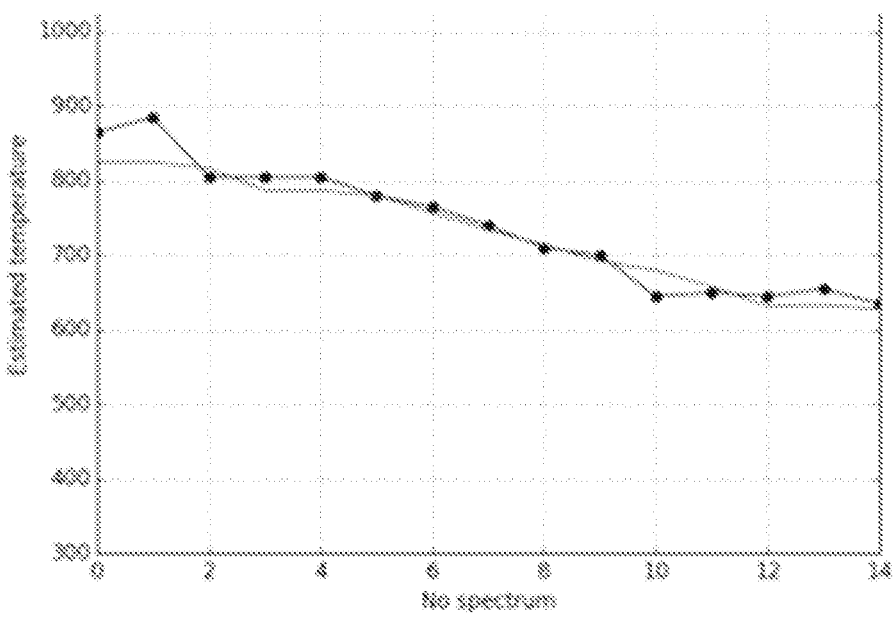
FIG. 5 illustrates comparative results of a steel strip temperature measured by thermocouples and estimated by the claimed process.

Comparative results of the temperature obtained through the thermocouples measures and via the claimed estimation are plotted in FIG. 5. The line with the dots represents the temperature estimated by the previously described method while the continuous line represents the temperature measured by thermocouples. It can clearly be seen that the temperature given by the present method is reliable.

What is claimed is:

1. A method for cooling a steel product, having a temperature from 300° C. to 1600° C., the method comprising:
performing a cooling treatment during or following:
a hot rolling and the steel product has a temperature from 300° C. to 1100° C. and wherein in step B, TJ ranges from 300° C. to 1100° C., or
a continuous casting and said steel product has a temperature from 800° C. to 1600° C. and wherein in step B, TJ ranges from 800° C. to 1600° C.;
A. a calibration step including the steps of
i. measuring intensities (I),
at 5 wavelengths ($\lambda$) ranging from 0.9 to 2.1 $\mu$m, wherein one is from 0.9 $\mu$m to 1.35 $\mu$m, one is from 1.35 $\mu$m to 1.55 $\mu$m, one is from 1.55 $\mu$m to 1.85 $\mu$m, one is from 1.85 $\mu$m to 2.05 $\mu$m and one is from 2.05 $\mu$m to 2.1 $\mu$m, by a hyperspectral camera,
of the radiation emitted by the steel product having a known temperature ($T_{REF}$) in measurement conditions characterized by an emissivity of the reference ($\varepsilon_{REF}$) and a transmittance of a medium between the steel product and the hyperspectral camera ($\alpha_{REF}$),
ii. computing a spectral attenuation coefficient $C_{CALIB}$ using the measured intensities (I) at the 5 wavelengths, $$C_{CALIB} = \frac{I}{P(\lambda, T_{REF})} = \varepsilon_{REF} \cdot \alpha_{REF}$$

where $P(\lambda, T_{REF})$ is the spectral density of electromagnetic radiation emitted by a black body in thermal equilibrium, based on the Planck Law, at a wavelength ($\lambda$) and at a temperature ($T_{REF}$),
iii. repeating the steps i. and ii. for $N_{CALIB}$ different combination of reference emissivity ($\varepsilon_{REF}$) and transmittance of a medium between the reference and said sensor hyperspectral camera ($\alpha_{REF}$) to obtain $N_{CALIB}$ spectral attenuation coefficients, $N_{CALIB}$ being an integer greater than 2,
B. a measurement step including the steps of
i. measuring, by the hyperspectral camera, intensities of the radiation emitted by the steel product, I, at the 5 wavelengths ($\lambda$) ranging from 0.9 to 2.1 $\mu$m, ii. computing $N_T$ spectral attenuation coefficients $C_{COMPUTE}Tj$, for $N_T$ temperatures (Tj) ranging from 300 to 1600° C. and for the 5 wavelengths, $N_T$ being an integer from 2 to 1300, $$C_{COMPUTE}Tj = \frac{1}{P(\lambda, Tj)} = \varepsilon_{COMPUTE} \times \alpha_{COMPUTE}$$

where
$P(\lambda, T_J)$ is the spectral density of electromagnetic radiation emitted by a black body in thermal equilibrium, based on the Planck Law, at a wavelength of $\lambda$ and at a temperature $T_J$, and
C. a comparison step including the steps of
i. performing a probability test for finding a most likely $C_{COMPUTE}Tj$ among the $C_{CALIB}$
ii. estimating a temperature of the steel product, $T_{REAL}$ as being equal to the temperature $T_J$ of the most likely $C_{COMPUTE}T_J$; and
adjusting the cooling treatment as a function of the estimated the temperature of the steel product, $T_{REAL}$.

2. The method as recited in claim 1 wherein the cooling treatment is performed during or following a hot rolling and the steel product has a temperature from 300° C. to 1100° C. and wherein in step B, $T_J$ ranges from 300° C. to 1100° C.

3. The method as recited in claim 1 wherein the cooling treatment is performed during or following a continuous casting and said steel product has a temperature from 800° C. to 1600° C. and wherein in step B, $T_J$ ranges from 800° C. to 1600° C.

4. The method as recited in claim 1 wherein in steps A)i. and B)i., the radiation intensities of 8 wavelengths ($\lambda$) ranging from 0.9 to 2.1 $\mu$m, wherein one is from 0.9 $\mu$m to 1.11 $\mu$m, one is from 1.11 $\mu$m to 1.15 $\mu$m, one is from 1.15 $\mu$m to 1.35 $\mu$m, one is from 1.35 $\mu$m to 1.55 $\mu$m, one is from 1.55 $\mu$m to 1.85 $\mu$m, one is from 1.85 $\mu$m to 2.05 $\mu$m, one is from 2.05 $\mu$m to 2.07 $\mu$m and one is from 2.07 $\mu$m to 2.1 $\mu$m are measured and in steps A)ii. and B)ii., spectral attenuation coefficients for the 8 wavelengths are computed.

5. The method as recited in claim 4 wherein in steps A)i. and B)i., the radiation intensities at 5 additional wavelengths ranging from 0.9 to 2.1 $\mu$m are measured and in steps A)ii. and B)ii., spectral attenuation coefficients for the 8 wavelengths and the 5 additional wavelengths are computed.

6. The method as recited in claim 4 wherein in steps A)i. and B)i., the radiation intensities at 42 additional wavelengths ranging from 0.9 to 2.1 $\mu$m are measured and in steps A)ii. and B)ii., spectral attenuation coefficients for the 8 wavelengths and the 42 additional wavelengths are computed.

7. The method as recited in claim 4 wherein in steps A)i. and B)i., the radiation intensities at 92 additional wavelengths ranging from 0.9 to 2.1 $\mu$m are measured and in steps A)ii. and B)ii., spectral attenuation coefficients for the 8 wavelengths and the 92 additional wavelengths are computed.

8. The method as recited in claim 1 wherein $N_{CALIB}$ is an integer from 2 to 1000.

9. The method as recited in claim 8 wherein $N_{CALIB}$ is an integer from 20 to 1000.

10. The method as recited in claim 1 wherein in step C)i., the probability test includes a dimensionality reduction on said $C_{CALIB}$ defining main components.

11. The method as recited in claim 10 wherein in step C)i., the dimensionality reduction is performed with a principal component analysis.

12. The method as recited in claim 1 wherein in step C)i., the probability test includes a projection of the $C_{CALIB}$ in a probabilistic model.

13. The method as recited in claim 12 wherein in step C)i., said probabilistic model is a Gaussian mixture model.

\* \* \* \* \*